US011378033B2

(12) United States Patent
Sugimoto

(10) Patent No.: US 11,378,033 B2
(45) Date of Patent: Jul. 5, 2022

(54) MISFIRE DETECTION APPARATUS FOR INTERNAL COMBUSTION ENGINE

(71) Applicant: TOYOTA JIDOSHA KABUSHIKI KAISHA, Toyota (JP)

(72) Inventor: Hitoki Sugimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/345,231

(22) Filed: Jun. 11, 2021

(65) Prior Publication Data

US 2022/0042473 A1 Feb. 10, 2022

(30) Foreign Application Priority Data

Aug. 7, 2020 (JP) .............................. JP2020-135300

(51) Int. Cl.
```
F02D 41/14      (2006.01)
F02D 41/00      (2006.01)
G01M 15/11      (2006.01)
```
(52) U.S. Cl.
CPC ..... *F02D 41/1498* (2013.01); *F02D 41/0097* (2013.01); *G01M 15/11* (2013.01); *F02D 41/1401* (2013.01); *F02D 2041/1409* (2013.01); *F02D 2041/1432* (2013.01); *F02D 2041/1433* (2013.01); *F02D 2200/101* (2013.01)

(58) Field of Classification Search
CPC ............. F02D 41/1498; F02D 41/0097; F02D 41/1401; F02D 2041/1409; F02D 2041/1432; F02D 2041/1433; F02D 2200/101; G01M 15/11

USPC ....................................... 73/114.04; 701/111
See application file for complete search history.

(56) References Cited

U.S. PATENT DOCUMENTS

| | | | | |
|---|---|---|---|---|
| 4,928,652 | A | * | 5/1990 | Shinya ................ F02D 41/1498 123/406.24 |
| 5,633,456 | A | * | 5/1997 | Stander .................. G01M 15/11 123/436 |
| 5,823,166 | A | * | 10/1998 | Entenmann ........... F02D 41/009 123/436 |
| 6,158,273 | A | * | 12/2000 | Jeremiasson ....... F02D 41/1498 73/114.02 |

(Continued)

FOREIGN PATENT DOCUMENTS

JP          2008-248877 A       10/2008

*Primary Examiner* — Sizo B Vilakazi
*Assistant Examiner* — Brian R Kirby
(74) *Attorney, Agent, or Firm* — Oblon, McClelland, Maier & Neustadt, L.L.P.

(57) ABSTRACT

A CPU substitutes a difference between a crank-side speed that is a rotation speed of a crankshaft and a downstream-side speed that is a speed of a portion, opposite from the crankshaft, in a damper into a differential speed. The CPU calculates a torsion angle through a process of integrating the differential speed. The CPU calculates a torsion speed component that is a speed component of the crankshaft due to torsion of the damper based on a process of integrating a value obtained by multiplying the torsion angle by an elastic modulus, and calculates a time that is a variable indicating a speed of the crankshaft, used to determine a misfire, based on the torsion speed component. The CPU subtracts a value obtained by subtracting an output value of the integrating process, applied to a finite response low-pass filter process, from the output value.

6 Claims, 8 Drawing Sheets

(56) References Cited

U.S. PATENT DOCUMENTS

| | | | | |
|---|---|---|---|---|
| 7,707,874 B2* | 5/2010 | Suzuki | G01M 15/11 | 73/114.04 |
| 7,712,356 B2* | 5/2010 | Suzuki | B60W 10/06 | 73/114.04 |
| 7,765,857 B2* | 8/2010 | Suzuki | G01M 15/11 | 73/114.04 |
| 7,849,733 B2* | 12/2010 | Suzuki | F02D 41/1497 | 73/114.04 |
| 7,971,474 B2* | 7/2011 | Suzuki | F02D 41/0097 | 73/114.25 |
| 8,001,832 B2* | 8/2011 | Suzuki | G01M 15/11 | 73/114.04 |
| 2003/0114228 A1* | 6/2003 | Zottmann | F16F 15/13438 | 464/68.92 |
| 2004/0230367 A1* | 11/2004 | Miller | H03H 17/0263 | 123/406.24 |
| 2008/0103681 A1* | 5/2008 | Shikama | G01M 15/11 | 701/111 |
| 2009/0118990 A1* | 5/2009 | Suzuki | B60L 50/61 | 701/111 |
| 2009/0145210 A1* | 6/2009 | Suzuki | G01M 15/11 | 73/114.04 |
| 2009/0308145 A1* | 12/2009 | Suzuki | F02D 41/2451 | 180/65.28 |
| 2010/0152991 A1* | 6/2010 | Suzuki | F02D 29/00 | 701/99 |
| 2010/0218598 A1* | 9/2010 | Suzuki | G01M 15/11 | 73/114.04 |
| 2012/0232774 A1* | 9/2012 | Minatoya | G01M 15/11 | 701/105 |
| 2014/0311230 A1* | 10/2014 | Boettcher | G01M 15/06 | 73/114.26 |
| 2017/0037800 A1* | 2/2017 | Sugimoto | F02D 41/0225 | |
| 2018/0202379 A1* | 7/2018 | Nagashima | F02D 41/1497 | |
| 2018/0275017 A1* | 9/2018 | Katayama | F02D 41/1498 | |

* cited by examiner

MISFIRE DETECTION APPARATUS FOR INTERNAL COMBUSTION ENGINE

CROSS-REFERENCE TO RELATED APPLICATION

This application claims priority to Japanese Patent Application No. 2020-135300 filed on Aug. 7, 2020, incorporated herein by reference in its entirety.

BACKGROUND

1. Technical Field

The disclosure relates to a misfire detection apparatus for an internal combustion engine.

2. Description of Related Art

For example, Japanese Unexamined Patent Application Publication No. 2008-248877 (JP 2008-248877 A) describes a misfire detection apparatus that is applied to an internal combustion engine of which a crankshaft is mechanically coupled to a drive wheel side via a damper. The apparatus calculates a torsion speed component due to resonance in the rotation speed of the crankshaft, based on a physical model. An input of the physical model is a difference between the rotation speed of the crankshaft and a downstream-side speed that is the drive wheel-side rotation speed of the damper. The apparatus determines whether there is a misfire based on a value obtained by removing the torsion speed component from the rotation speed of the crankshaft. The apparatus removes a low-frequency component that is a frequency component lower than a resonant frequency by using a high-pass filter in a process of calculating the torsion speed component.

SUMMARY

In the above-described apparatus, when the high-pass filter is made up of an infinite response filter, the phase characteristics vary with a frequency band. For this reason, when there is a plurality of rotation frequencies at which resonance occurs, the process of calculating a torsion speed component needs to be provided separately for each rotation frequency band at which resonance occurs.

An aspect of the disclosure relates to a misfire detection apparatus for an internal combustion engine.

1. The misfire detection apparatus is applied to a multi-cylinder internal combustion engine of which a crankshaft is connected to a power transmission destination via a damper. The misfire detection apparatus includes an electronic control unit. The electronic control unit is configured to execute a crank-side acquisition process of acquiring a crank-side speed that is a rotation speed of the crankshaft in a small rotation angle range; a downstream-side acquisition process of acquiring a downstream-side speed that is a rotation speed of a portion of the damper, opposite from the crankshaft, in a small rotation angle range; a calculation process of calculating a torsion speed component based on a physical model of which an input is a difference between the crank-side speed and the downstream-side speed, the torsion speed component being a component due to torsion of the damper in the crank-side speed; and a determination process of determining whether there is a misfire based on a determination speed variable that is a variable indicating a rotation speed of the crankshaft, from which the torsion speed component has been removed. The calculation process includes a correction process of correcting a value of a variable that is used in the physical model such that the value of the variable is reduced by an output value obtained by inputting time-series data of the variable to a finite-response low-pass filter.

With the above configuration, a low-frequency component can be extracted by using a low-pass filter. Therefore, a low-frequency component included in a value of a variable to be used in the physical model is reduced through the correction process. When the low-pass filter is a finite-response filter, it is possible to obtain the same phase characteristics in different frequency bands, and, by extension, it is possible to calculate torsion speed components in intended multiple frequency bands through the same process.

2. In the misfire detection apparatus, the low-pass filter may include a filter of which the number of the variables to be input is a multiple of the number of cylinders of the internal combustion engine. With this configuration, it is possible to set gains of frequency components of multiples of an integer submultiple of an incidence frequency of a compression top dead center to one and to reduce a difference in phase characteristics, and, by extension, it is possible to highly accurately calculate a torsion speed component.

3. In the misfire detection apparatus, the low-pass filter may include a filter configured to output a simple moving average of values of the variable in one combustion cycle. With this configuration, it is possible to exercise high performance in setting gains of frequency components of multiples of the frequency of 0.5th-order rotation to one and reducing a difference in phase characteristics.

4. In the misfire detection apparatus, the physical model may include a first integral element of which an input is a value according to the difference, and a second integral element of which an input is a value according to an output value of the first integral element, the low-pass filter may include a second output-side filter that is a filter of which an input is time-series data of an output value of the second integral element, and the correction process may include a process of correcting the output value of the second integral element such that the output value of the second integral element is reduced by an output value of the second output-side filter.

Factors that cause a low-frequency component include an integrating process. With the above configuration, when the output value of the second integral element is corrected such that the output value of the second integral element is reduced by an output value of the second output-side filter, a low-frequency component of the output value of the second integral element is reduced.

5. In the misfire detection apparatus, the physical model may include a first integral element of which an input is a value according to the difference, and a second integral element of which an input is a value according to an output value of the first integral element, the low-pass filter may include a first output-side filter that is a filter of which an input is time-series data of the output value of the first integral element, and the correction process may include a process of correcting the output value of the first integral element such that the output value of the first integral element is reduced by an output value of the first output-side filter.

Factors that cause a low-frequency component include an integrating process. With the above configuration, when the output value of the first integral element is corrected such that the output value of the first integral element is reduced by an output value of the first output-side filter, a low-frequency component of the output value of the first integral element is reduced.

6. In the misfire detection apparatus, the physical model may include a first integral element of which an input is a value according to the difference, and a second integral element of which an input is a value according to an output value of the first integral element, the low-pass filter may include a second input-side filter that is a filter of which an input is time-series data of the value according to the output value of the first integral element, and the correction process may include a process of correcting the value according to the output value of the first integral element, which is an input of the second integral element, such that the value according to the output value of the first integral element is reduced by an output value of the second input-side filter.

With the above configuration, the output value of the first integral element is corrected such that the output value of the first integral element is reduced by an output value of the second input-side filter. Therefore, it is possible to reduce a low-frequency component included in an input of the second integral element.

7. In the misfire detection apparatus, the physical model may include a first integral element of which an input is a value according to the difference, and a second integral element of which an input is a value according to an output value of the first integral element, the low-pass filter may include a first input-side filter that is a filter of which an input is time-series data of the difference, and the correction process may include a process of correcting the value according to the difference, which is an input of the first integral element, such that the value according to the difference is reduced by an output value of the first input-side filter. With the above configuration, a value according to the difference is corrected such that the value according to the difference is reduced by an output value of the first input-side filter, so it is possible to reduce a low-frequency component included in an input of the first integral element.

8. In the misfire detection apparatus, the calculation process may include a comb filter process of extracting components of multiples of 0.5th-order rotation in a value according to the output value of the second integral element.

With the above configuration, by employing a comb filter process of extracting components of multiples of 0.5th-order rotation, it is possible to reduce components other than the components of multiples of 0.5th-order rotation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
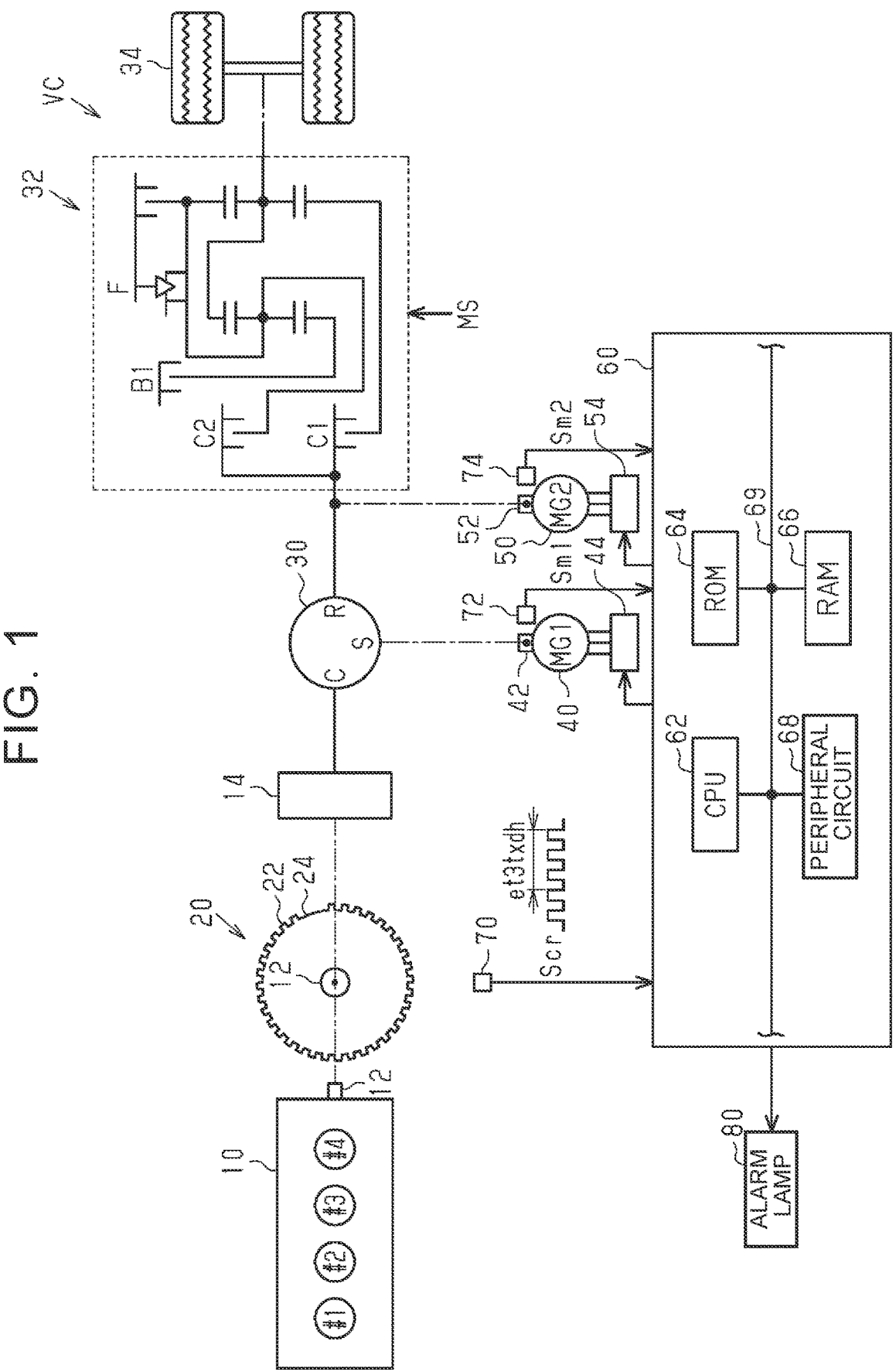
FIG. 1 is a diagram showing a control apparatus and a drive-train according to an embodiment.

Hereinafter, an embodiment will be described with reference to the accompanying drawings. As shown in FIG. 1, an internal combustion engine 10 is a four-stroke engine having four cylinders #1, #2, #3, #4. A crank rotor 20 having tooth portions 22 is coupled to a crankshaft 12 of the internal combustion engine 10. The tooth portions 22 respectively indicate multiple rotation angles of the crankshaft 12. The crank rotor 20 basically has the tooth portions 22 at an interval of 10° C.A; however, the crank rotor 20 has a toothless portion 24 that is a portion at which the interval between the adjacent tooth portions 22 is 30° C.A. This is to indicate a reference rotation angle of the crankshaft 12.

A power split device 30 is mechanically coupled to the crankshaft 12 via a damper 14. The power split device 30 splits the power of each of the internal combustion engine 10, a first motor generator 40, and a second motor generator 50. The power split device 30 includes a planetary gear train having a carrier C, a sun gear S, and a ring gear R. The crankshaft 12 is mechanically coupled to the carrier C via the damper 14. A rotary shaft 42 of the first motor generator 40 is mechanically coupled to the sun gear S. A rotary shaft 52 of the second motor generator 50 is mechanically coupled to the ring gear R. An output voltage of a first inverter 44 is applied to the terminals of the first motor generator 40. An output voltage of a second inverter 54 is applied to the terminals of the second motor generator 50.

In addition to the rotary shaft 52 of the second motor generator 50, drive wheels 34 are mechanically coupled to the ring gear R of the power split device 30 via a transmission 32. A control apparatus 60 controls the internal combustion engine 10 as a controlled object and operates various operating units of the internal combustion engine 10 to control torque, exhaust component ratio, and the like that are controlled variables of the internal combustion engine 10. The control apparatus 60 controls the first motor generator 40 as a controlled object and operates the first inverter 44 to control torque, rotation speed, and the like that are controlled variables of the first motor generator 40. The control apparatus 60 controls the second motor generator 50 as a controlled object and operates the second inverter 54 to control torque, rotation speed, and the like that are controlled variables of the second motor generator 50.

When the control apparatus 60 controls the above-described controlled variables, the control apparatus 60 refers to an output signal Scr of a crank angle sensor 70, an output signal Sm1 of a first rotation angle sensor 72, and an output signal Sm2 of a second rotation angle sensor 74. The first rotation angle sensor 72 detects the rotation angle of the rotary shaft 42 of the first motor generator 40. The second rotation angle sensor 74 detects the rotation angle of the rotary shaft 52 of the second motor generator 50.

The control apparatus 60 includes a CPU 62, a ROM 64, a RAM 66, and a peripheral circuit 68 that are able to communicate with one another via a local network 69. The peripheral circuit 68 includes a circuit that generates a clock signal for regulating internal operations, a power supply circuit, a reset circuit, and the like. The control apparatus 60 controls the controlled variables by the CPU 62 running a program stored in the ROM 64.

Figure 2:
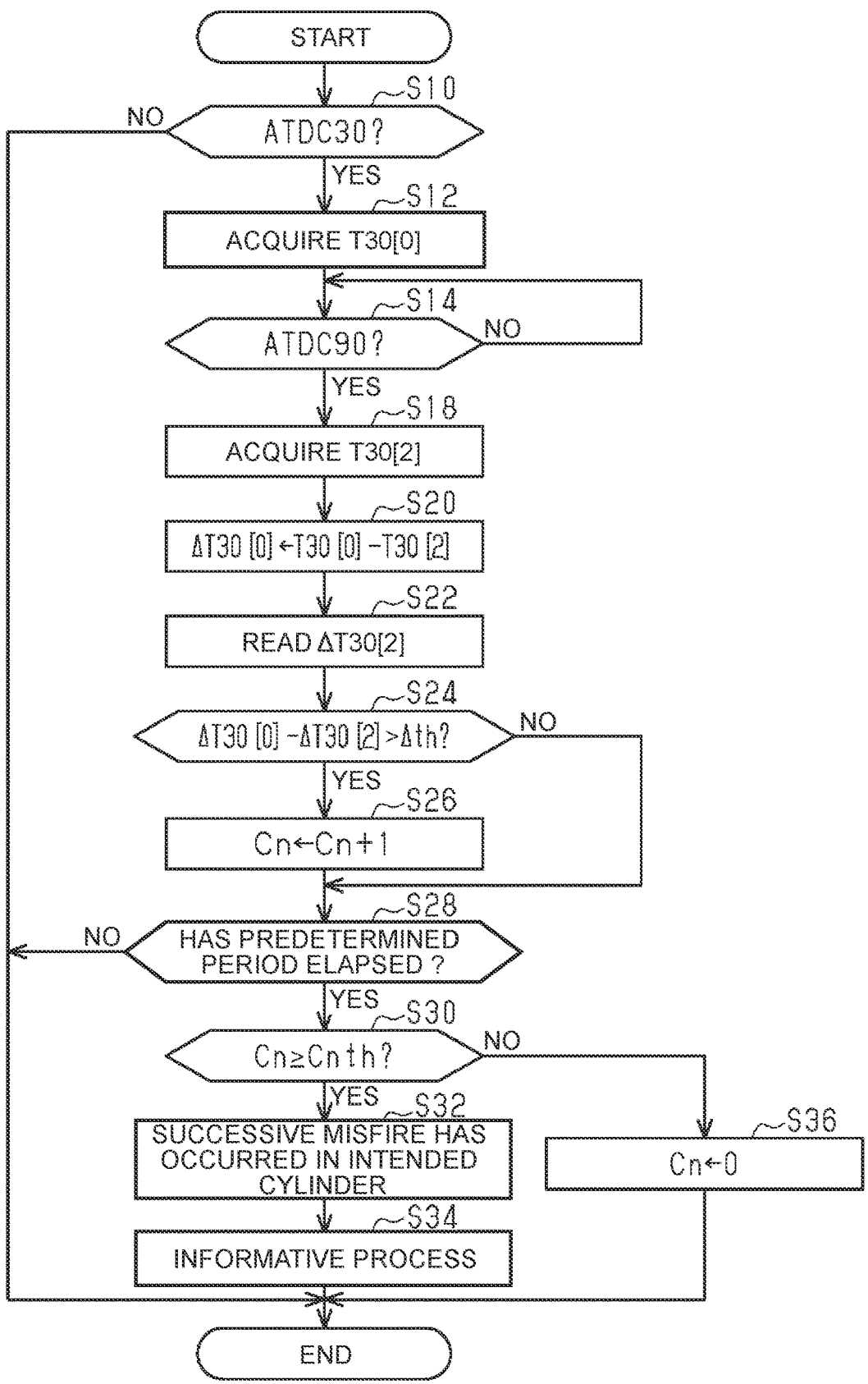
FIG. 2 is a flowchart showing the procedure of a process to be executed by the control apparatus according to the embodiment.

FIG. 2 shows the procedure of a process to be executed by the control apparatus 60. The process shown in FIG. 2 is implemented by the CPU 62 repeatedly running the program stored in the ROM 64 at predetermined crank angle intervals. Hereinafter, numerals prefixed with "S" represent step numbers of processes.

In a series of processes shown in FIG. 2, the CPU 62 initially determines whether the current rotation angle of the crankshaft 12 is ATDC30° C.A with reference to the compression top dead center of one of the cylinders #1, #2, #3, #4, for detection of a misfire (S10). When the CPU 62 determines that the current rotation angle is ATDC30° C.A (YES in S10), the CPU 62 acquires a time T30[0] required for the crankshaft 12 to rotate 30° C.A from the compression top dead center (S12). Subsequently, the CPU 62 waits until the current rotation angle becomes ATDC90° C.A (NO in S14). When the CPU 62 determines that the current rotation angle is ATDC90° C.A (YES in S14), the CPU 62 acquires a time T30[2] required for the crankshaft 12 to rotate from ATDC60° C.A to ATDC90° C.A (S18). A numeral in parentheses suffixed to T30 is a variable that increases by one each time the rotation angle advances 30° C.A. The CPU 62 substitutes a value obtained by subtracting the time T30[2] from the time T30[0] into a rotation variation ΔT30[0] related to the cylinder in which the compression top dead center is detected in the process of S10 (S20). The rotation variation ΔT30 is negative when no misfire is occurring in the cylinder for detection of a misfire and is positive when a misfire is occurring. The CPU 62 causes the RAM 66 to store the rotation variation ΔT30[0].

Subsequently, the CPU 62 reads a rotation variation ΔT30[2] 360° C.A before (S22). The rotation variation ΔT30[2] is a value stored in the RAM 66 in the process of S20 360° C.A before. The CPU 62 determines whether a value obtained by subtracting the rotation variation ΔT30[2] from the rotation variation ΔT30[0] is greater than a threshold Δth (S24). When no misfire is occurring in the cylinder for detection of a misfire, the rotation variation ΔT30[0] and the rotation variation ΔT30[2] are comparable amounts, and the subtracted value is a value near zero. In contrast, when a misfire is occurring in the cylinder for detected of a misfire, the subtracted value is a large positive value. The threshold Δth is set to a value that the subtracted value can take when a misfire occurs.

When the CPU 62 determines that the subtracted value is greater than the threshold Δth (YES in S24), the CPU 62 increments a counter Cn (S26). When the CPU 62 completes the process of S26 or makes a negative determination in the process of S24, the CPU 62 determines whether a predetermined period has elapsed from a later one of the timing at which the process of S24 is executed for the first time and the execution timing of the process of S36 (described later) (S28). When the CPU 62 determines that the predetermined period has elapsed (YES in S28), the CPU 62 determines that the counter Cn is greater than or equal to a threshold Cnth (S30). The threshold Cnth is set according to the number of times a misfire occurs in the cylinder within a predetermined period when a misfire successively occurs in the intended cylinder. When the CPU 62 determines that the counter Cn is greater than or equal to the threshold Cnth (YES in S30), the CPU 62 determines that a misfire has successively occurred in the cylinder for detection of a misfire (S32). The CPU 62 executes an informative process of informing a user of that fact by operating an alarm lamp 80 shown in FIG. 1 (S34).

On the other hand, when the CPU 62 determines that the counter Cn is less than the threshold Cnth (NO in S30), the CPU 62 initializes the counter Cn (S36). When the CPU 62 completes the process of S34 or S36 or makes a negative determination in the process of S10 or S28, the CPU 62 once ends the series of processing shown in FIG. 2.

Figure 3:
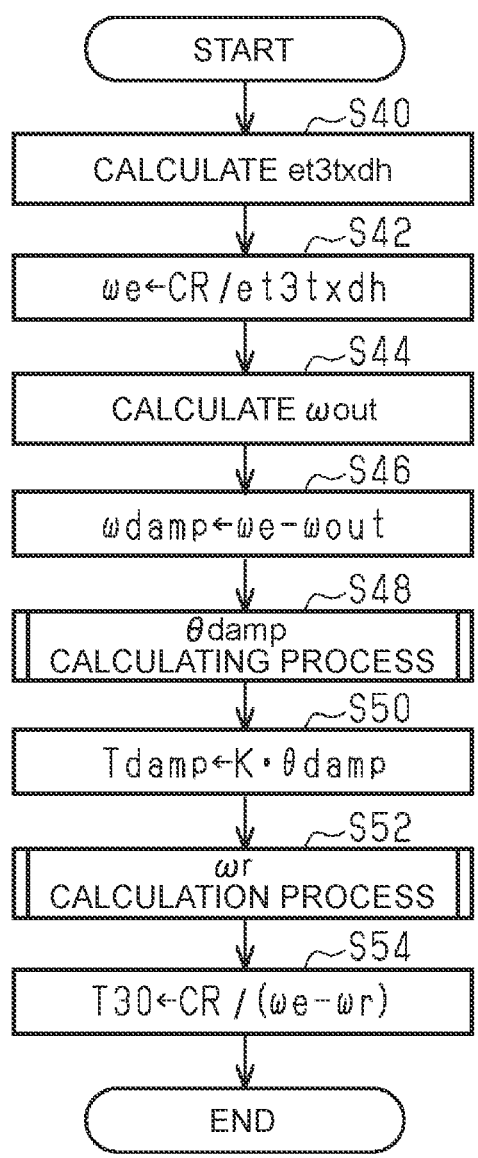
FIG. 3 is a flowchart showing the procedure of a process to be executed by the control apparatus according to the embodiment.

FIG. 3 shows the procedure of a process of calculating a time T30 required for the crankshaft 12 to rotate 30° C.A. The process shown in FIG. 3 is implemented by the CPU 62 running a program stored in the ROM 64 at intervals at which the crankshaft 12 rotates 30° C.A. Specifically, the process is repeatedly executed on condition that, for example, the crank angle sensor 70 detects a predetermined tooth portion 22. The predetermined tooth portion 22 is defined at every 30° C.A.

In a series of processing shown in FIG. 3, the CPU 62 initially calculates a time et3txdh required for the crankshaft 12 to rotate the last 30° C.A rotation angle range (S40). As shown in FIG. 1, this process is a process of counting a time required from when the crank angle sensor 70 detects any one of two tooth portions 22 spaced 30° C.A apart from each other to when the crank angle sensor 70 detects the other one. Subsequently, the CPU 62 calculates a crank-side speed we that is the rotation speed of the crankshaft 12 in the last 30° C.A rotation angle range by dividing an angle constant CR corresponding to 30° C.A by the time et3txdh (S42).

Subsequently, the CPU 62 calculates a downstream-side speed ωout that is a carrier C-side rotation speed in the damper 14 (S44). The CPU 62 calculates the downstream-side speed ωout based on a rotation speed ωm1 of the rotary shaft 42 of the first motor generator 40 in a small rotation angle range, a rotation speed ωm2 of the rotary shaft 52 of the second motor generator 50 in the small rotation angle range, and the gear ratio of the power split device 30. The small rotation angle range is defined as a rotation angle range smaller than one rotation. The rotation speed ωm1 is calculated by the CPU 62 based on an output signal Sm1 of the first rotation angle sensor 72. The rotation speed ωm2 is calculated by the CPU 62 based on an output signal Sm2 of the second rotation angle sensor 74.

Subsequently, the CPU 62 substitutes a value obtained by subtracting the downstream-side speed ωout from the crank-side speed we into a differential speed ωdamp (S46). Then, the CPU 62 calculates a torsion angle θdamp between the crankshaft 12-side portion and carrier C-side portion of the damper 14 based on a process of integrating the differential speed ωdamp (S48). After that, the CPU 62 substitutes a value obtained by multiplying an elastic modulus K by the torsion angle θdamp into a torsion torque Tdamp (S50). The torsion torque Tdamp is a torque that is generated when the absolute value of the torsion angle θdamp between the crankshaft 12-side portion and carrier C-side portion of the damper 14 is greater than zero.

The CPU 62 calculates a torsion speed component ωr that is a speed component obtained by quantifying the influence of the torque generated by the torsion of the damper 14 on the rotation speed of the crankshaft 12 based on a process of integrating the torsion torque Tdamp (S52). Here, a physical model that calculates a torsion speed component ωr through a process of integrating an angular acceleration component of the crankshaft 12, proportional to the torsion torque Tdamp, is used. The CPU 62 substitutes a value obtained by dividing the angle constant CR by a value obtained by subtracting the torsion speed component ωr from the crank-side speed we into the time T30 (S54).

When the CPU 62 completes the process of S54, the CPU 62 once ends the series of processing shown in FIG. 3.

Figure 4:
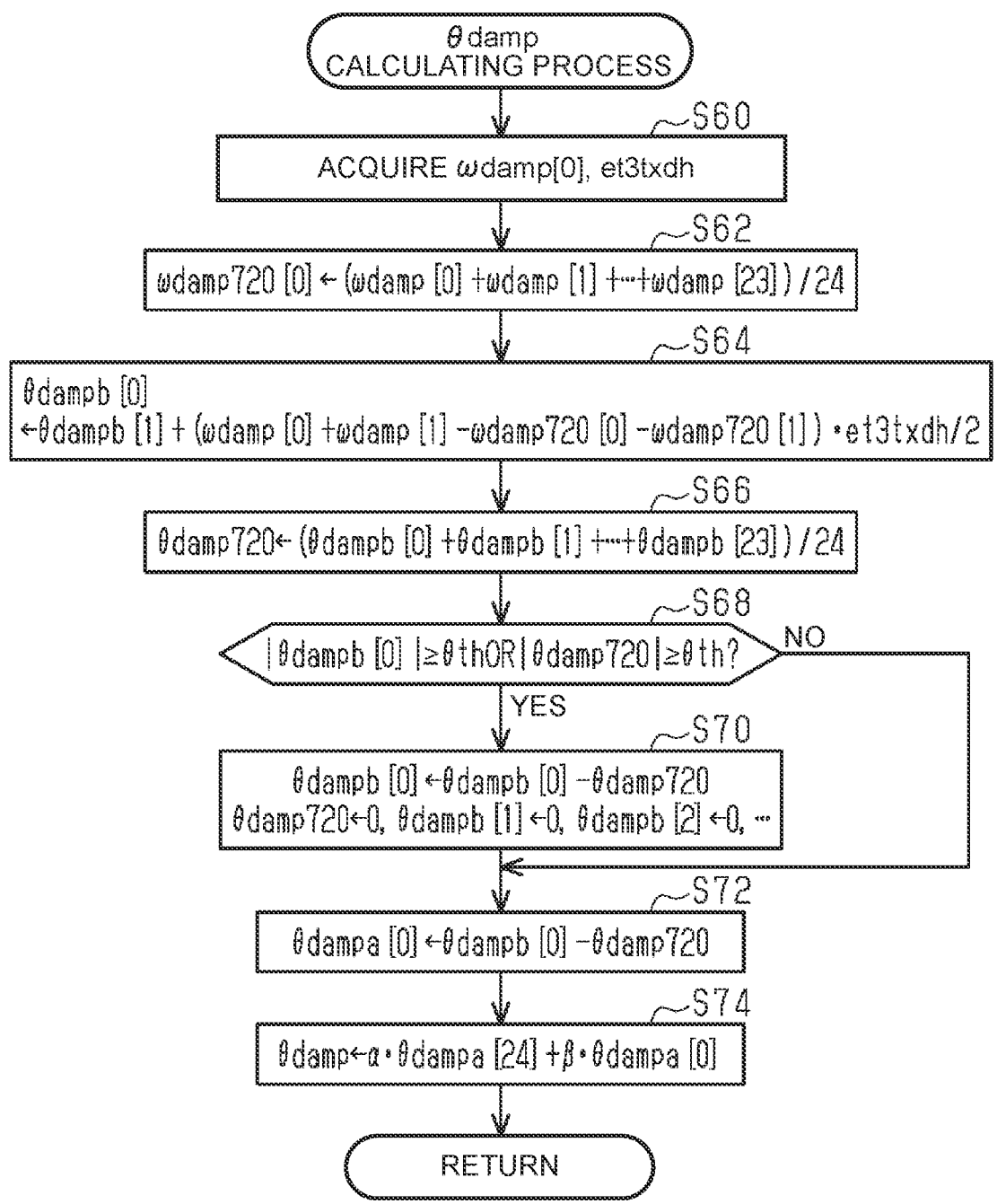
FIG. 4 is a flowchart showing the detailed procedure of part of a process to be executed by the control apparatus according to the embodiment.

FIG. 4 shows the detailed procedure of the process of S48. In a series of processing shown in FIG. 4, the CPU 62 initially acquires the last calculated differential speed ωdamp and the time et3txdh (S60). Subsequently, the CPU 62 substitutes a simple moving average of the last 24 differential speeds ωdamp[0], ωdamp[1], ωdamp[2], ωdamp[3], ωdamp[4], ωdamp[5], ωdamp[6], ωdamp[7], ωdamp[8], ωdamp[9], ωdamp[10], ωdamp[11], ωdamp[12], ωdamp[13], ωdamp[14], ωdamp[15], ωdamp[16], ωdamp[17], ωdamp[18], ωdamp[19], ωdamp[20], ωdamp[21], ωdamp[22], ωdamp[23] into an average differential speed ωdamp720[0] (S62). An average differential speed ωdamp720 is a variable obtained by removing a high-frequency component from a differential speed ωdamp. In other words, the average differential speed ωdamp720 is a variable obtained by applying a low-pass filter process to the differential speed ωdamp. A larger variable i of a differential speed ωdamp[i] indicates an older value.

Subsequently, the CPU 62 calculates a torsion angle θdampb that is a base of the torsion angle θdamp through the process of integrating the differential speed ωdamp (S64). In the present embodiment, trapezoidal approximation is illustrated as the integrating process. In other words, for an integral element according to the present embodiment, a variable to be added to the last torsion angle θdampb[1] to calculate the current torsion angle θdampb[0] is set to an amount equivalent to ½ of the product of the time et3txdh and the sum of the differential speeds ωdamp[0], ωdamp[1] instead of a value obtained by multiplying the time et3txdh by the current differential speed ωdamp[0]. More specifically, the variable is set to ½ of the product of the time et3txdh and the sum of values respectively obtained by removing low-frequency components from the differential speeds ωdamp[0], ωdamp[1]. Here, a value obtained by removing a low-frequency component from the differential speed ωdamp[0] is "ωdamp[0]−ωdamp720[0]", and a value obtained by removing a low-frequency component from the differential speed ωdamp[1] is "ωdamp[1]−ωdamp720[1]". Here, a low-frequency component is a component having a period longer than or equal to one combustion cycle.

Subsequently, the CPU 62 substitutes a simple moving average of the last 24 torsion angles θdampb[0], θdampb[1], θdampb[2], θdampb[3], θdampb[4], θdampb[5], θdampb[6], θdampb[7], θdampb[8], θdampb[9], θdampb[10], θdampb[11], θdampb[12], θdampb[13], θdampb[14], θdampb[15], θdampb[16], θdampb[17], θdampb[18], θdampb[19], θdampb[20], θdampb[21], θdampb[22], θdampb[23] into an average torsion angle θdamp720 (S66). An average torsion angle θdamp720 is a variable obtained by removing a high-frequency component from a torsion angle θdampb. In other words, the average torsion angle θdamp720 is a variable obtained by applying a low-pass filter process to the torsion angle θdampb. A larger variable i of a torsion angle θdampb[i] indicates an older value.

Subsequently, the CPU 62 determines whether the logical addition of the condition that the absolute value of the torsion angle θdampb[0] is greater than or equal to a threshold θth and the condition that the absolute value of the average torsion angle θdamp720 is greater than or equal to the threshold θth is true (S68). This process is a process of determining whether a low-frequency component that has not been removed by using the average differential speed ωdamp720 is accumulated in the torsion angle θdampb and whether a low-frequency component is accumulated in the average differential speed ωdamp720 itself. When the CPU 62 determines that the logical addition is true (YES in S68), the CPU 62 substitutes a value obtained by subtracting the average torsion angle θdamp720 from the torsion angle θdampb[0] into the torsion angle θdampb[0] and initializes the average torsion angle θdamp720 and the torsion angles θdampb[1], θdampb[2], θdampb[3], θdampb[4], θdampb[5], θdampb[6], θdampb[7], θdampb[8], θdampb[9], θdampb[10], θdampb[11], θdampb[12], θdampb[13], θdampb[14], θdampb[15], θdampb[16], θdampb[17], θdampb[18], θdampb[19], θdampb[20], θdampb[21], θdampb[22], θdampb[23] (S70).

When the CPU 62 completes the process of S70 or makes a negative determination in the process of S68, the CPU 62 substitutes a value obtained by subtracting the average torsion angle θdamp720 from the torsion angle θdampb[0] into a torsion angle θdampa[0] (S72). This process is a process of removing a low-frequency component from the torsion angle θdampb[0]. Here, a low-frequency component is a component having a period longer than or equal to one combustion cycle.

Subsequently, the CPU 62 calculates a torsion angle θdamp by applying a comb filter process to a torsion angle θdampa (S74). In the present embodiment, a feedforward filter is employed as a comb filter. More specifically, a filter that applies a weighted moving average process to the current torsion angle θdampa[0] and a torsion angle θdampa[24] one combustion cycle before is employed. In other words, the CPU 62 uses the sum of a value obtained by multiplying a coefficient β by the current torsion angle θdampa[0] and a value obtained by multiplying a coefficient α by the torsion angle θdampa[24] one combustion cycle before as a torsion angle θdamp. Here, α+β=1.

Figure 5:
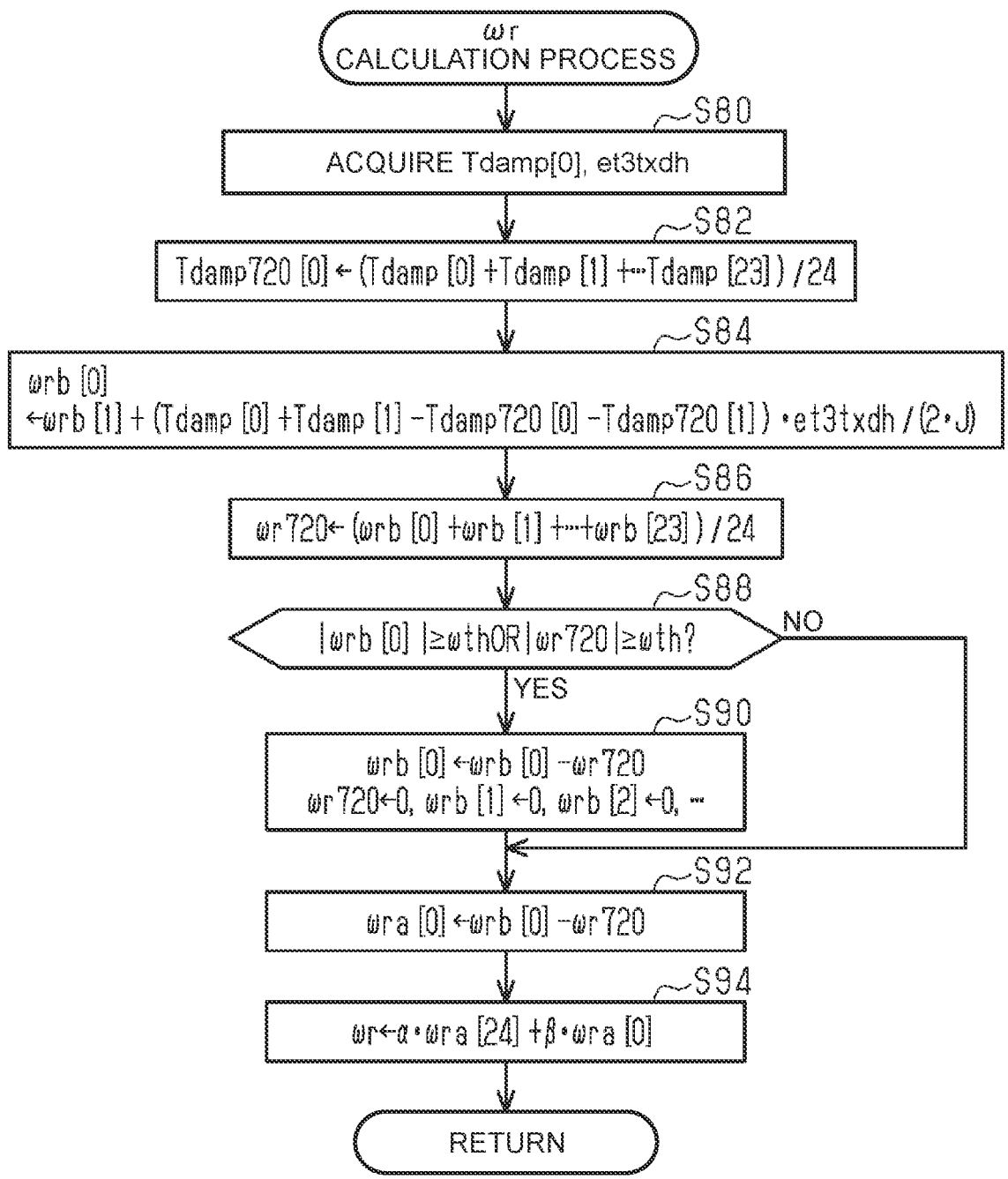
FIG. 5 is a flowchart showing the detailed procedure of part of a process to be executed by the control apparatus according to the embodiment.

When the CPU 62 completes the process of S74, the CPU 62 completes the process of S48 of FIG. 3. FIG. 5 shows the detailed procedure of the process of S52 of FIG. 3. As shown in FIG. 5, the CPU 62 initially acquires the time et3txdh and the last torsion torque Tdamp[0] calculated in the process of S50 (S80). Subsequently, the CPU 62 substitutes a simple moving average of the last 24 torsion torques Tdamp[0], Tdamp[1], Tdamp[2], Tdamp[3], Tdamp[4], Tdamp[5], Tdamp[6], Tdamp[7], Tdamp[8], Tdamp[9], Tdamp[10], Tdamp[11], Tdamp[12], Tdamp[13], Tdamp[14], Tdamp[15], Tdamp[16], Tdamp[17], Tdamp[18], Tdamp[19], Tdamp[20], Tdamp[21], Tdamp[22], Tdamp[23] into an average torsion torque Tdamp720[0] (S82). An average torsion torque Tdamp720 is a variable obtained by removing a high-frequency component from a torsion torque Tdamp. In other words, an average torsion torque Tdamp720 is a variable obtained by applying a low-pass filter process to a torsion torque Tdamp. A larger variable i of the torsion torque Tdamp[i] indicates an older value.

Subsequently, the CPU 62 calculates a torsion speed component ωrb that is a base of a torsion speed component ωr through a process of integrating a value obtained by dividing a torsion torque Tdamp by the coefficient of inertia J (S84). In the present embodiment, trapezoidal approximation is illustrated as the integrating process. In other words, for an integral element according to the present embodiment, a variable to be added to the last torsion speed component ωrb[1] to calculate the current torsion speed component ωrb[0] is set to an amount equivalent to ½ of the product of the time et3txdh and the sum of values respectively obtained by dividing the torsion torques Tdamp[0], Tdamp[1] by the coefficient of inertia J. More specifically, the variable is set to ½ of the product of the time et3txdh and the sum of values respectively obtained by removing low-frequency components from the torsion torques Tdamp[0], Tdamp[1]. Here, a value obtained by removing a low-frequency component from the torsion torque Tdamp[0] is "Tdamp[0]−Tdamp720[0]", and a value obtained by removing a low-frequency component from the torsion torque Tdamp[1] is "Tdamp[1]−Tdamp720[1]". Here, a low-frequency component is a component having a period longer than or equal to one combustion cycle.

Subsequently, the CPU 62 substitutes a simple moving average of the last 24 torsion speed components ωrb[0], ωrb[1], ωrb[2], ωrb[3], ωrb[4], ωrb[5], ωrb[6], ωrb[7], ωrb[8], ωrb[9], ωrb[10], ωrb[11], ωrb[12], ωrb[13], ωrb [14], ωrb[15], ωrb[16], ωrb[17], ωrb[18], ωrb[19], ωrb[20], ωrb[21], ωrb[22], ωrb[23] into an average torsion speed component ωr720 (S86). An average torsion speed component ωr720 is a variable obtained by removing a high-frequency component from a torsion speed component ωrb. In other words, an average torsion speed component ωr720 is a variable obtained by applying a low-pass filter process to a torsion speed component orb. A larger variable i of a torsion speed component ωrb[i] indicates an older value.

Subsequently, the CPU 62 determines whether the logical addition of the condition that the absolute value of the torsion speed component ωrb[0] is greater than or equal to a threshold ωth and the condition that the absolute value of the average torsion speed component ωr720 is greater than or equal to the threshold ωth is true (S88). This process is a process of determining whether a low-frequency component that has not been removed by using the average torsion speed component ωr720 is accumulated in the torsion speed component ωrb and whether a low-frequency component is accumulated in the average torsion speed component ωr720 itself. When the CPU 62 determines that the logical addition is true (YES in S88), the CPU 62 substitutes a value obtained by subtracting the average torsion speed component ωr720 from the torsion speed component ωrb[0] into the torsion speed component ωrb[0] and initializes the average torsion speed component ωr720 and the torsion speed components ωrb[1], ωrb[2], ωrb[3], ωrb[4], ωrb[5], ωrb[6], ωrb[7], ωrb[8], ωrb[9], ωrb[10], ωrb[11], ωrb[12], ωrb[13], ωrb [14], ωrb[15], ωrb[16], ωrb[17], ωrb[18], ωrb[19], ωrb[20], ωrb[21], ωrb[22], ωrb[23] (S90).

When the CPU 62 completes the process of S90 or makes a negative determination in the process of S88, the CPU 62 substitutes a value obtained by subtracting the average torsion speed component ωr720 from the torsion speed component ωrb[0] into a torsion speed component ωra[0] (S92). This process is a process of removing a low-frequency component from the torsion speed component ωrb [0]. Here, a low-frequency component is a component having a period longer than or equal to one combustion cycle.

Subsequently, the CPU 62 calculates a torsion speed component ωr by applying a comb filter process to a torsion speed component ωra (S94). In the present embodiment, a feedforward filter is employed as a comb filter. More specifically, a filter that applies a weighted moving average process to the current torsion speed component ωra[0] and a torsion speed component ωra[24] one combustion cycle before is employed. In other words, the CPU 62 uses the sum of a value obtained by multiplying a coefficient β by the current torsion speed component ωra[0] and a value obtained by multiplying a coefficient α by the torsion speed component ωra[24] one combustion cycle before as a torsion speed component ωr. Here, α+β=1.

When the CPU 62 completes the process of S94, the CPU 62 completes the process of S52 of FIG. 3. Here, the operation and advantageous effects of the present embodiment will be described. The CPU 62 executes a process of detecting a misfire by using a time T30 that is a value obtained by dividing an angle constant CR by a value obtained by subtracting a torsion speed component ωr from a crank-side speed we instead of directly using a time et3txdh that is a difference between the detection timings of the tooth portions 22 spaced 30° C.A apart from each other. Here, the CPU 62 uses a finite-response low-pass filter to remove a low-frequency component in calculating the torsion speed component ωr. With this configuration, it is possible to set gains of a filter at the time when the rotation frequencies of the crankshaft 12 of the internal combustion engine 10 are integer multiples of the frequency of 0.5th-order rotation to one and to obtain the same phase characteristics. Therefore, even when multiple different frequencies coincide with the resonant frequencies of a drive-train, the situation can be handled by using a common filter that calculates a torsion speed component ωr.

Figure 6:
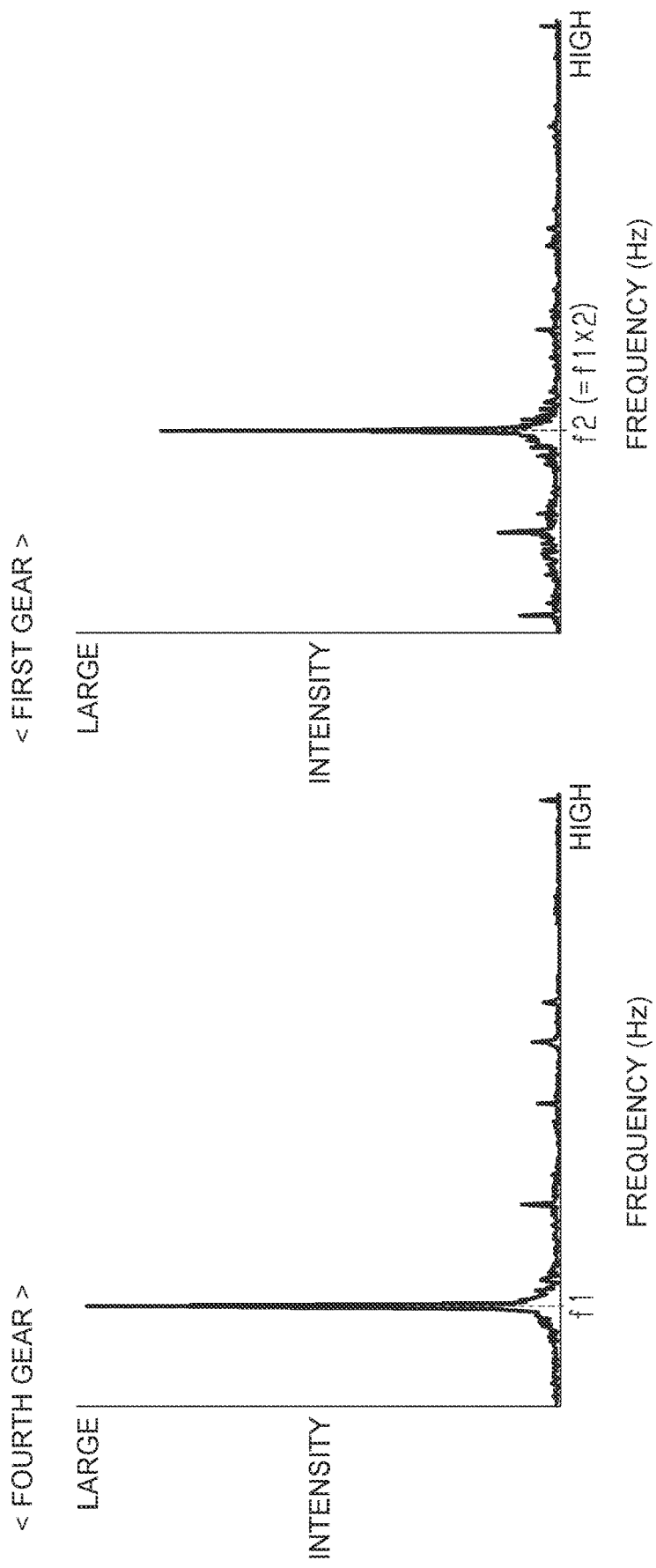
FIG. 6 is a graph showing a frequency intensity distribution according to the embodiment.

FIG. 6 illustrates a resonant frequency component in the present embodiment. As shown in FIG. 6, in the present embodiment, when the gear ratio of the transmission 32 is fourth gear, the frequency of 0.5th-order rotation coincides with a resonant frequency f1 of the drive-train. When the gear ratio of the transmission 32 is first gear, the frequency of first-order rotation coincides with a resonant frequency f2. The resonant frequency f2 is twice as high as the resonant frequency f1. Therefore, in the filter used to calculate a torsion speed component ωr, not only a gain at the frequency of 0.5th-order rotation and a gain at the frequency of first-order rotation are increased as much as possible as constant values but also the same phase characteristics need to be obtained at those frequencies. In other words, when, for example, gain characteristics are similar to each other, but when phase characteristics are not the same, logic used to calculate a torsion speed component ωr needs to be changed according to whether the gear ratio is fourth gear or first gear.

Figure 7:
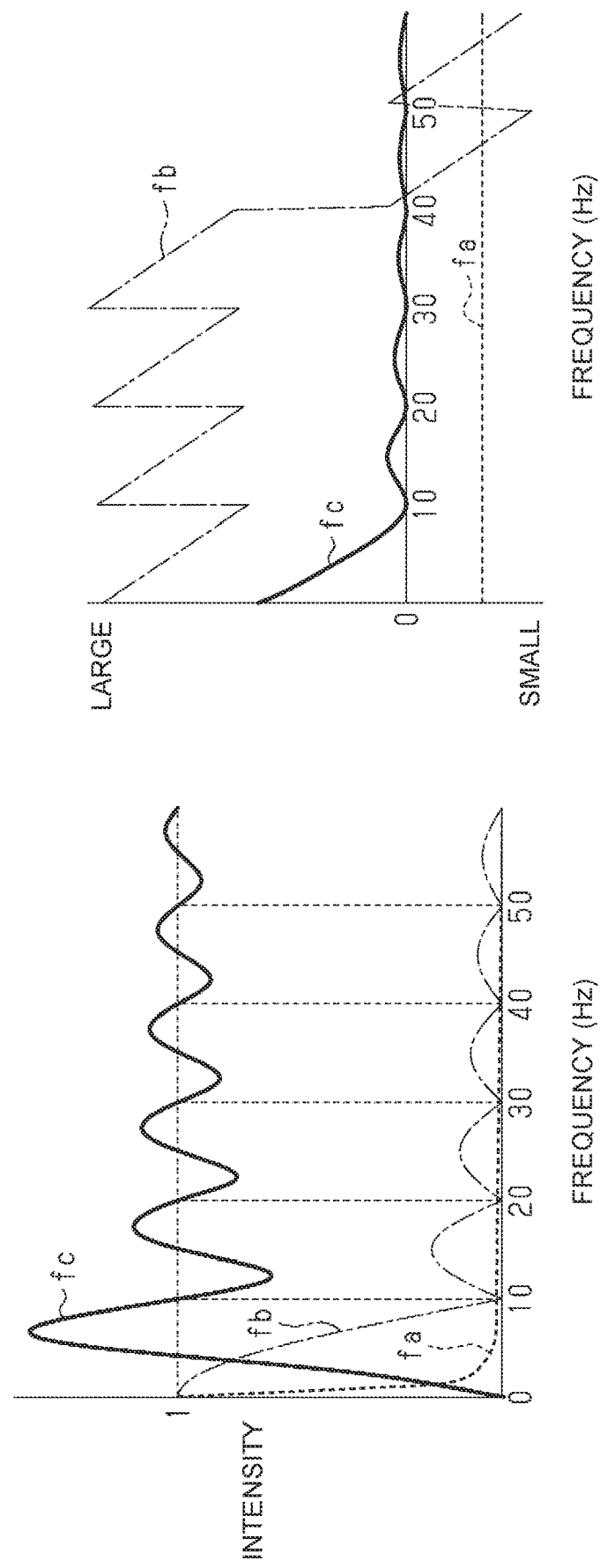
FIG. 7 is a graph showing an effect according to the embodiment.

FIG. 7 shows the gain characteristics and phase characteristics of a filter according to the present embodiment. For the sake of convenience of description, FIG. 7 schematically shows graphs representing that the frequency of 0.5th-order rotation coincides with a resonant frequency at 10 Hz, and the frequency of first-order rotation coincides with a resonant frequency at 20 Hz.

Curves fa represented by the dashed lines in FIG. 7 show the characteristics of the integral element to be used in the processes of S64 and S84. Curves fb represented by the alternate long and short dashed lines show the characteristics of the low-pass filter to be used in the processes of S62, S66, S82, and S86. Curves fc represented by the continuous lines show the characteristics of a combination of the integral element and the low-pass filter. As shown in FIG. 7, by combining the integral element and the low-pass filter, it is possible to set gains at frequencies that are integer multiples of the frequency of 0.5th-order rotation to one and to obtain the same phases at zero.

Figure 8:
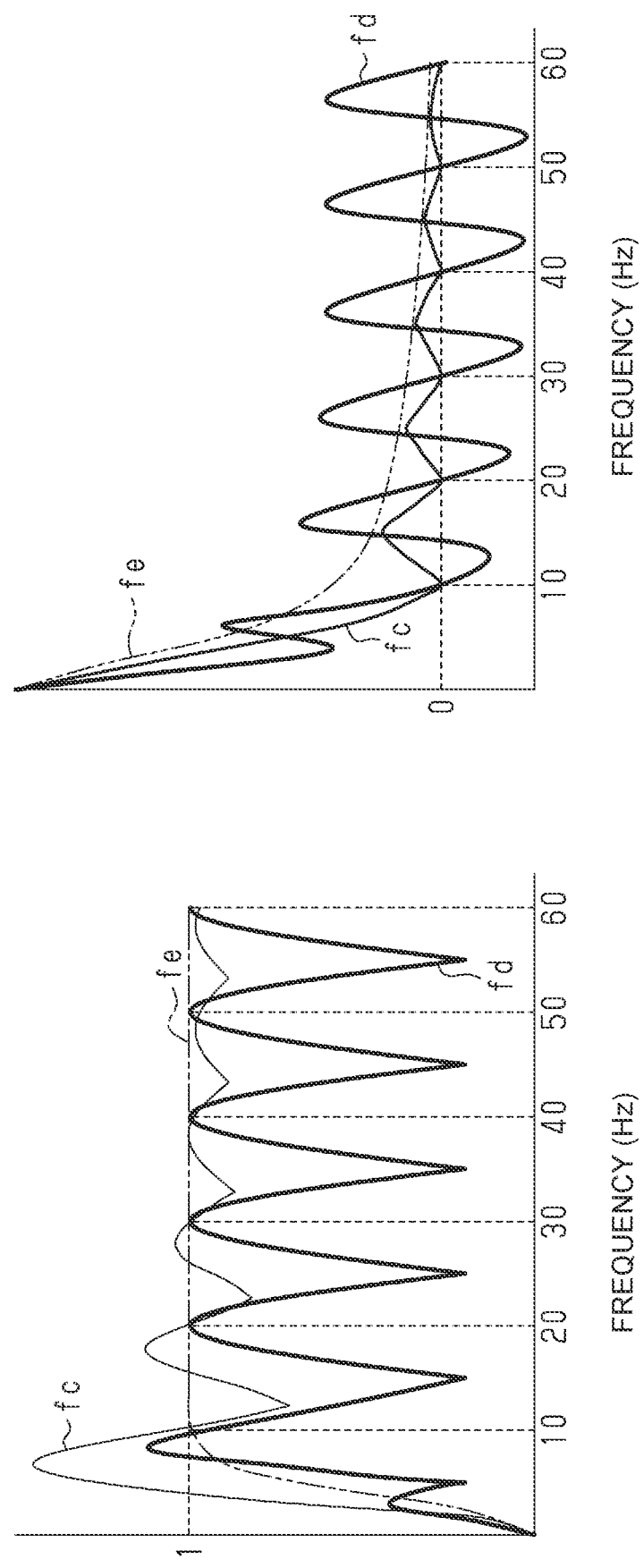
FIG. 8 is a graph showing an effect according to the embodiment.

Curves fd shown in FIG. 8 show characteristics added with the comb filter used in the processes of S74 and S94. As shown in FIG. 8, by using the comb filter, it is possible to reduce gains at frequencies lower than the frequency of 0.5th-order rotation. This is because a filter that extracts components of frequencies that are multiples of the frequency of 0.5th-order rotation is used as the comb filter.

FIG. 8 further shows characteristics in the case of using an infinite-response high-pass filter by curves fe represented by the alternate long and two-short dashed lines in calculating a torsion speed component ωr. When an infinite-response high-pass filter is used, it is possible to set gains in a frequency band higher than or equal to the frequency of 0.5th-order rotation to one and reduce gains in a frequency band lower than the frequency of 0.5th-order rotation. Therefore, the characteristics are exceedingly desirable in terms of only gain characteristics. However, it is not possible to obtain the same phase characteristics at frequencies that are integer multiples of the frequency of 0.5th-order rotation. Therefore, as illustrated in FIG. 6, it is necessary to separately design a filter to calculate a torsion speed component ωr between when the frequency component of 0.5th-order rotation coincides with a resonant frequency in fourth gear and when the frequency component of first-order rotation coincides with a resonant frequency in first gear.

According to the above-described embodiment, operation and advantageous effects described below are further obtained.

(1) The filter of which the number of variables to be input is a multiple of the number of cylinders of the internal combustion engine 10 is used as the low-pass filter used in the processes of S62, S66, S82, and S86. With this configuration, it is possible to set gains of frequency components of multiples of an integer submultiple of the incidence frequency of the compression top dead center to one and to reduce a difference in phase characteristics.

(2) The filter that outputs a simple moving average of values of a variable in one combustion cycle is used as the low-pass filter to be used in the processes of S62, S66, S82, and S86. With this configuration, it is possible to exercise high performance by setting gains of frequency components of multiples of the frequency of 0.5th-order rotation to one and to reduce a difference in phase characteristics.

(3) When the absolute value of the torsion angle θdampb[0] or the absolute value of the average torsion angle θdamp720 exceeds the threshold θth, the torsion angles θdampb[1], θdampb[2], θdampb[3], θdampb[4], θdampb[5], θdampb[6], θdampb[7], θdampb[8], θdampb[9], θdampb[10], θdampb[11], θdampb[12], θdampb[13], θdampb[14], θdampb[15], θdampb[16], θdampb[17], θdampb[18], θdampb[19], θdampb[20], θdampb[21], θdampb[22], θdampb[23] are initialized. With this configuration, even when the absolute value of a torsion angle θdampb increases to some extent due to the fact that a low-frequency component is not completely removed through the low-pass filter process, this situation can be corrected.

(4) When the absolute value of the torsion speed component ωrb[0] or the absolute value of the average torsion speed component ωr720 exceeds the threshold ωth, the torsion speed components ωrb[1], ωrb[2], ωrb[3], ωrb[4], ωrb[5], ωrb[6], ωrb[7], ωrb[8], ωrb[9], ωrb[10], ωrb[11], ωrb[12], ωrb[13], ωrb[14], ωrb[15], ωrb[16], ωrb[17], ωrb[18], ωrb[19], ωrb[20], ωrb[21], ωrb[22], ωrb[23] are initialized. With this configuration, even when the absolute value of a torsion speed component ωrb increases to some extent due to the fact that a low-frequency component is not completely removed through the low-pass filter process, this situation can be corrected.

Correspondence Relationship

Matters in the above-described embodiment may be regarded as the matters described in SUMMARY as follows. Hereinafter, the correspondence relationship will be described for each of the numbers of the articles described in SUMMARY. [1] The crank-side acquisition process may be regarded as the processes of S40 and S42. The downstream-side acquisition process may be regarded as the process of S44. The calculation process may be regarded as the processes of S48, S50, and S52. The determination process may be regarded as the processes of S24, S26, S28, S30, and S32. The correction process may be regarded as the processes of S64, S72, S84, and S92. [2] This configuration may be regarded as applying a process of calculating a moving average of 24 values in the processes of S62, S66, S82, and S86. [3] This configuration may be regarded as the processes of S62, S66, S82, and S86. [4] to [7] The first integral element may be regarded as the integral element used in the process of S64. The second integral element may be regarded as the integral element used in the process of S84. The second output-side filter may be regarded as the FIR filter used in the process of S86. The first output-side filter may be regarded as the FIR filter used in the process of S66. The second input-side filter may be regarded as the FIR filter used in the process of S82. The first input-side filter may be regarded as the FIR filter used in the process of S62. [8] The comb filter process may be regarded as the process of S94.

Other Embodiments

The present embodiment may be modified as follows. The present embodiment and the following modifications may be implemented in combination without any technical contradiction.

Low-Pass Filter

In the above-described embodiment, the value of a variable to be input to the low-pass filter process is calculated at every 30° C.A; however, the configuration is not limited thereto. The value of a variable to be input to the low-pass filter process may be calculated at, for example, every 10° C.A or every 60° C.A, which is an integer submultiple of 180° C.A. Of course, the value of a variable to be input to the low-pass filter process is not limited thereto. However, the value of a variable to be input to the low-pass filter process is desirably calculated at every integer submultiple of the interval at which the compression top dead center appears.

In the above-described embodiment, time-series data in one combustion cycle of the value of a variable to be calculated at every integer submultiple of the interval at which the compression top dead center appears is input to the low-pass filter process; however, the configuration is not limited thereto. For example, time-series data in two combustion cycles may be input to the low-pass filter process. With this configuration as well, it is possible to obtain the same gain and align phases at frequencies of integer multiples of the frequency of 0.5th-order rotation. Of course, it is not indispensable to use time-series data at integer multiples of one combustion cycle as inputs to the low-pass filter process. When, for example, resonance occurs only at frequencies higher than or equal to the frequency of first-order rotation, time-series data in two strokes may be input to the low-pass filter process.

In the above-described embodiment, the number of values of a variable to be input to the low-pass filter used in the processes of S62, S66, S82, and S86 is the same; however, the configuration is not limited thereto. For example, while the number of values of a variable to be input to the low-pass filter used in the processes of S82 and S86 is set to 24, the number of values of a variable to be input to the low-pass filter used in the processes of S62 and S66 may be set to 12. In this case as well, the value of a variable to be input to the low-pass filter used in the processes of S62 and S66 is desirably calculated at every integer submultiple of the interval at which the compression top dead center appears.

In the above-described embodiment, time-series data in one combustion cycle that is a predetermined period common to values of a variable to be calculated at every integer submultiple of the interval at which the compression top dead center appears in the processes of S62, S66, S82, and S86 is input to the low-pass filter process; however, the configuration is not limited thereto. For example, while time-series data in one combustion cycle is input to the low-pass filter in the processes of S82 and S86, time-series data in two combustion cycles may be input to the low-pass filter process in the processes of S62 and S66.

In the above-described embodiment, the low-pass filter process in all the processes of S62, S66, S82, and S86 is a simple moving average calculation process; however, the configuration is not limited thereto. For example, while a simple moving average calculation process is applied in the processes of S82 and S86, an exponential moving average calculation process may be applied in the processes of S62 and S66.

In at least one of the processes of S62, S66, S82, and S86, it is not indispensable to use a simple moving average calculation process, and any finite-response filter may be used.

First Integral Element

In the above-described embodiment, an example in which trapezoidal approximation is applied as the integral element in the process of S64; however, the configuration is not limited thereto. For example, a process of adding the product of the last differential speed ωdamp[0] and a time interval may be applied as occasion arises.

Second Integral Element

In the above-described embodiment, an example in which trapezoidal approximation is applied as the integral element in the process of S84; however, the configuration is not limited thereto. For example, a process of adding the product of a time interval and a value obtained by dividing the last torsion torque Tdamp[0] by the coefficient of inertia J and a time interval may applied as occasion arises.

Physical Model

In the above-described embodiment, a model using the elastic modulus K and the coefficient of inertia J as fixed values is illustrated as a physical model for calculating a torsion speed component ωr; however, the configuration is not limited thereto. The elastic modulus K may be variable according to a torsion angle θdamp by, for example, setting the elastic modulus K to a larger value when the absolute value of a torsion angle θdamp is large than when the absolute value of a torsion angle θdamp is small.

A physical model for calculating a torsion speed component or is not limited to a model including only the elastic modulus K and the coefficient of inertia J. The physical model may be, for example, a model that uses the sum of a term consisting of the product of the coefficient of viscosity and a differential speed ωdamp and a term consisting of the product of a torsion angle θdamp and an elastic modulus K as a torsion torque Tdamp.

Calculation Process

In the above-described embodiment, the low-pass filter process is executed in each of the processes of S62, S66, S82, and S86; however, the configuration is not limited thereto. For example, while the low-pass filter process is executed in only the process of S86, the low-pass filter process does not need to be executed in the other processes.

In the above-described embodiment, the comb filter process is executed in both the processes of S74 and S94; however, the configuration is not limited thereto. For example, while the comb filter process is executed in the process of S94, the comb filter process may be omitted in the process of S74. Of course, it is not indispensable to execute the comb filter process.

Determination Speed Variable

In the above-described embodiment, a time T30 required to rotate in a small rotation angle range is illustrated as a determination speed variable; however, the configuration is not limited thereto. For example, a rotation speed in a small rotation angle range may be used.

Determination Process

In the above-described embodiment, it is determined whether there is a misfire based on a difference between times required for the crankshaft 12 to rotate 30° C.A. For example, it may be determined whether there is a misfire based on the ratio of times required for the crankshaft 12 to rotate 30° C.A. Also, for example, as described in the article "Determination Speed Variable", when the determination speed variable is set to a variable having a dimension of speed, it may be determined whether there is a misfire based on a difference between angular velocities when the crankshaft 12 rotates 30° C.A Furthermore, for example, it may be determined whether there is a misfire based on the ratio of angular velocities when the crankshaft 12 rotates 30° C.A.

A small rotation angle for determining the rotation speed of the crankshaft 12 or a time required for the crankshaft 12 to rotate, to be used in the determination process, is not limited to 30° C.A and may be an appropriate rotation angle less than or equal to the interval at which the compression top dead center appears.

In the above-described embodiment, a process of determining whether a misfire has successively occurred in a specific cylinder is illustrated; however, a misfire determination process based on a torsion speed component ωr is not limited thereto.

Usage of Low-Pass Filter

In the above-described embodiment, when resonant frequencies in different gear ratios are different from each other, an FIR low-pass filter is employed to align phases through the filter process; however, the configuration is not limited thereto. Even when no transmission 32 is provided, but when, for example, resonance occurs in successive misfires of one cylinder at a predetermined rotation speed NE, resonance occurs in the case of an opposite cylinder misfire that, at a ½ rotation speed of a predetermined rotation speed, a misfire successively occurs in a pair of cylinders shifted by one rotation from each other. When, for example, an IIR high-pass filter is used at the time of calculating a torsion speed component ωr, there occurs a difference in phase characteristics between the frequency of first-order rotation and the frequency of 0.5th-order rotation. For this reason, it is not possible to handle a one-cylinder successive misfire and an opposite cylinder misfire with the same filter, and, as a result, it is required to, for example, add a phase compensation in determining an opposite cylinder misfire. In contrast, by using the FIR low-pass filter as described above, it is possible to obtain the same phase characteristics between the frequency of first-order rotation and the frequency of 0.5th-order rotation. Therefore, it is possible to use the same logic for the process of calculating a torsion speed component ωr between a one cylinder successive misfire and an opposite cylinder misfire.

Misfire Detection Apparatus

The misfire detection apparatus is not limited to the one that includes the CPU 62 and the ROM 64 and that executes software processing. The misfire detection apparatus may include, for example, a dedicated hardware circuit, such as an ASIC, that performs hardware processing on at least part of the one subjected to software processing in the above-described embodiment. In other words, the misfire detection apparatus may be configured as any one of the following (a)

to (c). (a) The misfire detection apparatus includes a processing unit that executes all the processes in accordance with programs and a program storage device, such as a ROM, that stores the programs. (b) The misfire detection apparatus includes a processing unit and a program storage device that execute part of the processes in accordance with programs and a dedicated hardware circuit that executes the remaining processes. (c) The misfire detection apparatus includes a dedicated hardware circuit that executes all the processes. A plurality of the software processors each including a processing unit and a program storage device, or a plurality of the dedicated hardware circuits may be provided.

Vehicle

The vehicle is not limited to a series-parallel hybrid vehicle. The vehicle may be, for example, a series hybrid vehicle or a parallel hybrid vehicle. The vehicle is not limited to the one including an internal combustion engine and a motor generator as in-vehicle rotating machines. The vehicle may be, for example, the one including an internal combustion engine but not including a motor generator or may be, for example, the one including a motor generator but not including an internal combustion engine.

What is claimed is:

1. A misfire detection apparatus that is applied to a multi-cylinder internal combustion engine of which a crankshaft is connected to a power transmission destination via a damper, the misfire detection apparatus comprising an electronic control unit configured to execute:
   a crank-side acquisition process of acquiring a crank-side speed that is a rotation speed of the crankshaft in a small rotation angle range;
   a downstream-side acquisition process of acquiring a downstream-side speed that is a rotation speed of a portion of the damper, opposite from the crankshaft, in a small rotation angle range;
   a calculation process of calculating a torsion speed component based on a physical model of which an input is a difference between the crank-side speed and the downstream-side speed, the torsion speed component being a component due to torsion of the damper in the crank-side speed; and
   a determination process of determining whether there is a misfire in the internal combustion engine based on a determination speed variable that is a variable indicating a rotation speed of the crankshaft, from which the torsion speed component has been removed, wherein:
   the calculation process includes a correction process of correcting a value of a variable that is used in the physical model such that the value of the variable is reduced by an output value obtained by inputting time-series data of the variable to a finite-response low-pass filter,
   the physical model includes a first integral element of which an input is a value according to the difference, and a second integral element of which an input is a value according to an output value of the first integral element,
   the low-pass filter includes a second output-side filter that is a filter of which an input is time-series data of an output value of the second integral element, and
   the correction process includes a process of correcting the output value of the second integral element such that the output value of the second integral element is reduced by an output value of the second output-side filter.

2. The misfire detection apparatus according to claim 1, wherein the low-pass filter includes a filter of which the number of the variables to be input is a multiple of the number of cylinders of the internal combustion engine.

3. The misfire detection apparatus according to claim 1, wherein the low-pass filter includes a filter configured to output a simple moving average of values of the variable in one combustion cycle.

4. The misfire detection apparatus according to claim 1, wherein the calculation process includes a comb filter process of extracting components of multiples of 0.5th-order rotation in a value according to the output value of the second integral element.

5. A misfire detection apparatus that is applied to a multi-cylinder internal combustion engine of which a crankshaft is connected to a power transmission destination via a damper, the misfire detection apparatus comprising an electronic control unit configured to execute:
   a crank-side acquisition process of acquiring a crank-side speed that is a rotation speed of the crankshaft in a small rotation angle range;
   a downstream-side acquisition process of acquiring a downstream-side speed that is a rotation speed of a portion of the damper, opposite from the crankshaft, in a small rotation angle range;
   a calculation process of calculating a torsion speed component based on a physical model of which an input is a difference between the crank-side speed and the downstream-side speed, the torsion speed component being a component due to torsion of the damper in the crank-side speed; and
   a determination process of determining whether there is a misfire in the internal combustion engine based on a determination speed variable that is a variable indicating a rotation speed of the crankshaft, from which the torsion speed component has been removed, wherein:
   the calculation process includes a correction process of correcting a value of a variable that is used in the physical model such that the value of the variable is reduced by an output value obtained by inputting time-series data of the variable to a finite-response low-pass filter,
   the physical model includes a first integral element of which an input is a value according to the difference, and a second integral element of which an input is a value according to an output value of the first integral element,
   the low-pass filter includes a first output-side filter that is a filter of which an input is time-series data of the output value of the first integral element, and
   the correction process includes a process of correcting the output value of the first integral element such that the output value of the first integral element is reduced by an output value of the first output-side filter.

6. A misfire detection apparatus that is applied to a multi-cylinder internal combustion engine of which a crankshaft is connected to a power transmission destination via a damper, the misfire detection apparatus comprising an electronic control unit configured to execute:
   a crank-side acquisition process of acquiring a crank-side speed that is a rotation speed of the crankshaft in a small rotation angle range;
   a downstream-side acquisition process of acquiring a downstream-side speed that is a rotation speed of a portion of the damper, opposite from the crankshaft, in a small rotation angle range;

a calculation process of calculating a torsion speed component based on a physical model of which an input is a difference between the crank-side speed and the downstream-side speed, the torsion speed component being a component due to torsion of the damper in the crank-side speed; and a determination process of determining whether there is a misfire in the internal combustion engine based on a determination speed variable that is a variable indicating a rotation speed of the crankshaft, from which the torsion speed component has been removed, wherein:

the calculation process includes a correction process of correcting a value of a variable that is used in the physical model such that the value of the variable is reduced by an output value obtained by inputting time-series data of the variable to a finite-response low-pass fitter, the physical model includes a first integral element of which an input is a value according to the difference, and a second integral element of which an input is a value according to an output value of the first integral element, the low-pass filter includes a second input-side filter that is a filter of which an input is time-series data of the value according to the output value of the first integral element, and the correction process includes a process of correcting the value according to the output value of the first integral element, which is an input of the second integral element, such that the value according to the output value of the first integral element is reduced by an output value of the second input-side filter.

* * * * *